Aug. 26, 1930.  W. MERRILL  1,773,924
METHOD OF MANUFACTURING TUBULAR ARTICLES
Filed Jan. 30, 1929
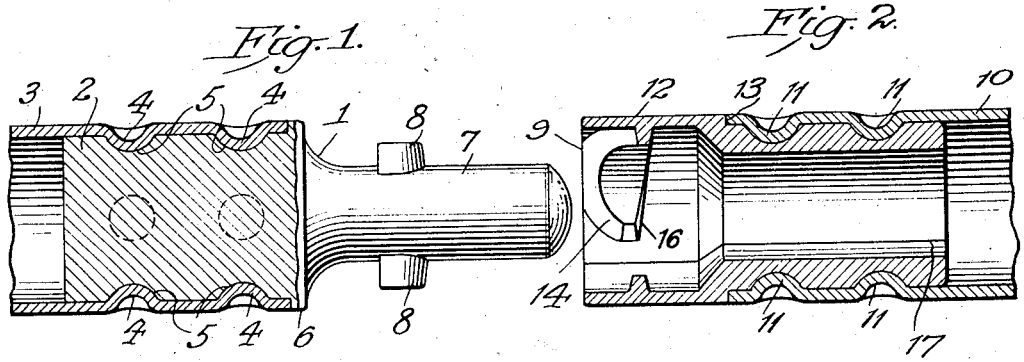
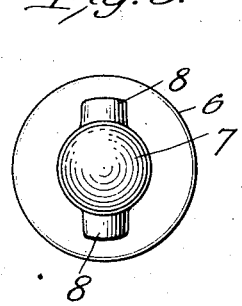
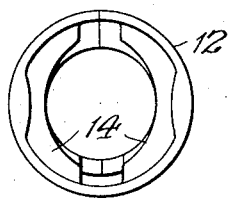
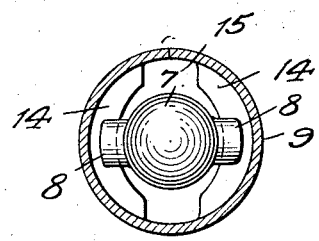
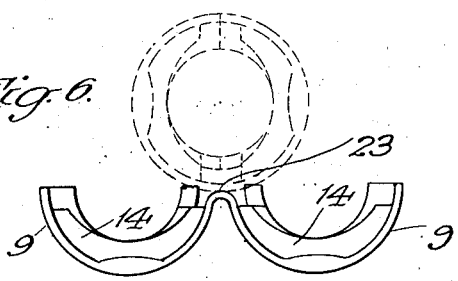
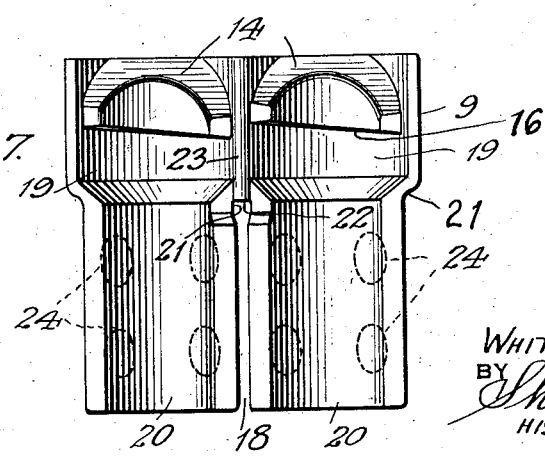
INVENTOR
WHITNEY MERRILL
BY Sheffield & Betts
HIS ATTORNEYS Patented Aug. 26, 1930

1,773,924

UNITED STATES PATENT OFFICE

WHITNEY MERRILL, OF BROOKLYN, NEW YORK

METHOD OF MANUFACTURING TUBULAR ARTICLES

Application filed January 30, 1929. Serial No. 336,284.

This invention relates in general to a method for manufacturing tubular articles and is concerned more particularly with an improved method for manufacturing the socket member which constitutes an element of certain types of couplings used to connect tubular members or pipes together.

It will be appreciated from the description of the method hereinafter given that it is readily adapted to be used in the manufacture of tubular articles other than coupling sockets but for convenience only, the method is described herein as applied to the manufacture of such sockets.

Scaffoldings erected to support workmen during the erection or remodeling of buildings, observation towers, display racks and other structures of a similar nature are frequently constructed of metallic tubular members or pipes suitably connected together where they cross in horizontal and vertical directions. As it would be extremely impractical to employ tubular members whose lengths equal the overall dimensions of the scaffolding, for example, it is customary to connect convenient lengths of tubing together by couplings, an improved form of which is illustrated and described herein for the purpose of explaining the present invention.

Because of the large number of couplings ordinarily necessary, it is desirable that they be of simple construction, easily applied and cheap. The form of coupling described herein has been found to meet these requirements satisfactorily and it is the object of the present invention to describe an improved method of manufacturing the socket member of such a coupling whereby they may be made more cheaply.

Heretofore these coupling sockets were cast and then machined so as to accommodate the coupling plug, which necessarily was an expensive and slow method. According to the present invention these coupling sockets are drop-forged or similarly formed from a blank of suitable material. But before describing the method of the present invention in detail, the construction of the coupling members will be described, reference being made to the accompanying drawing in which Fig. 1 is a partial cross-sectional view of a preferred form of coupling plug showing a section of tubing connected thereto.

Fig. 2 is a partial cross-sectional view of a preferred form of coupling socket showing a section of tubing connected thereto.

Fig. 3 is a right end view of the plug shown in Fig. 1.

Fig. 4 is a left end view of the socket shown in Fig. 2.

Fig. 5 is a cross-sectional view through a piece of tubing showing the relative positions of the plug and socket when two sections of tubing have been connected together by means of the coupling described herein.

Fig. 6 is an end view of the coupling socket in the process of manufacture after it has been punched but before it has been bent into tubular form, and Fig. 7 is a plan view thereof.

In the drawing the numeral 1 indicates a coupling plug of which one end 2 is of relatively greater diameter than the other end and is adapted to fit snugly in the end of a section of tubing 3 as shown in Fig. 1. The tubing may be, and preferably is, connected to the end 2 of the plug by means of a plurality of depressions 4 therein which are forced into suitable recesses 5 in the end 2 of the plug, thus making a strong, rigid connection between the coupling members and the pipe sections. The plug 1 is provided with a flange 6 as shown, to limit the depth of insertion of the end 2 in the tubular member 3. The end 7 of the plug 1 is of reduced diameter and is provided with two diametrically opposite lugs 8 which project from the surface of the end 7 as more clearly shown in Fig. 3.

A coupling socket 9 is inserted in the end of the tubular member 10 which is to be connected with the tubular member 3 and is held in position therein by means of the depressions 11 as described above. The coupling member 9 is provided with a head 12 having a shoulder 13 against which the end of the tubular member 10 abuts to limit the depth of insertion of the coupling socket in the tubular member. Two diametrically opposite locking projections 14 are formed integral on the interior surface of the coupling head 12, as illustrated in Figs. 2 and 4, and are adapted to wedge against the lugs 8 on the coupling plug 1 to hold the coupling plug and coupling socket together. Clearance spaces 15 between the locking projections 14 are made of sufficient width to permit the projections 8 on the coupling plug to pass between the projections 14. Helical surfaces 16 are provided on the inner surfaces of the projections 14 as shown in Fig. 2, whereby upon rotation of the coupling socket with respect to the coupling plug these two members are drawn together longitudinally. The end of the coupling socket which extends into the tubular member 10 is of such thickness as to accommodate in the recesses formed therein the depressions 11 and has a central opening 17 of such diameter that the end 7 of the coupling plug may be readily inserted therein.

When desired to connect the tubular members 3 and 10 together after they have been connected to the plug 1 and socket 9, respectively, the coupling plug 1 is inserted in the coupling socket 9 by aligning the lugs 8 with the spaces 15 so that the lugs may be positioned to lie in back of the locking projections 14. Thereafter the coupling socket 9 is rotated with respect to the coupling plug 1 so that the lugs 8 are positioned on the surfaces 16 as indicated more clearly in Fig. 5. As described above the helical surfaces 16 cause the coupling plug and coupling socket to be brought together longitudinally and the relative positions of the lugs 8 and projections 14 are such that when the socket has been rotated through a convenient angle, preferably slightly in excess of 90 degrees, the end of the coupling head 12 will abut against the flange 6 on plug 1.

It will be observed that by these constructions the tubular members 3 and 10 have been connected together so that they cannot be disconnected without rotating the one with respect to the other and that the external surface of the head 12 of the coupling socket 9 and the flange 6 on the coupling plug 1 lie flush with the external surfaces of the tubular members, thus permitting clamps or other fastening means to be placed over the tubing where two sections thereof are connected together.

The method of making the coupling sockets according to the present invention may be described as follows, reference being made to Figs. 6 and 7: A blank of suitable material, preferably steel, of the desired thickness is stamped out substantially in the form of a rectangle, one dimension of which is equal to the length of the coupling socket and the other dimension is equal to the circumference of the socket. A slot 18 is formed in the central portion of the blank and extends in from one edge of the blank to the portion 19 of the blank from which the head of the socket is formed as illustrated in Fig. 7. The margins of the head portion 19 and the portions 20 are offset from one another as indicated at 21 in order to provide the finished socket with the enlarged head 12. The upper end of the slot 18 is widened as shown at 22 to facilitate the bending of the blank as described below.

The blank thus formed is heated and then drop-forged or otherwise treated so that the sections thereof on each side of the slot 18 and the central portion 23 are formed into the shapes required of them in the finished socket. In the present instance this forging operation comprises bending these sections into substantially semi-cylindical form and providing them with the locking projections 14 and with the recesses 24 used in connecting the tubing to the socket.

After this forging operation the central portion 23 of the blank is bent to bring the sections thereof on each side of the portion 23 together until the substantially circular cross-section shown by the dotted lines in Fig. 6 is produced.

As this bending occurs wholly within the central portion 23 which, as shown in Fig. 6, is comparatively thin, a very great force is not necessary and there is no danger of distorting the adjacent sections of the blank. The blank increases in thickness at the bevel surface 21 but as this surface does not extend across the central portion 23 because of the enlarged opening 22, no additional bending force is required.

Although not usually necessary, the margins of the slot 18 and the outer margins of the blank which now lie close to each other may be welded or otherwise united together. To protect the socket from corrosion and rust, it may be galvanized or otherwise protectively treated.

It will be apparent from the description that the method herein described is not necessarily confined to the manufacture of tubular sockets but, on the contrary, is readily adapted to be used in the manufacture of other articles of various cross sections which may or may not enclose a definite area to form a tubular cross section. Thus, for example, the present method may be employed in the manufacture of channeled articles or articles of sheet material having other non-homaloidal cross sections.

What is claimed and desired to be protected by Letters Patent is:

1. The method of making hollow coupling sockets from metallic blanks which comprises forging said blanks while in substantially flat form into connected semi-cylindrical portions having internal projections forming locking members, and then bending the portions so formed along a central longitudinal line to bring the outer edges of the semi-cylindrical portions together to form the coupling socket.

2. The method of making hollow coupling sockets from suitable material which comprises, forming a blank having a central longitudinal slot therein extending in from one end of said blank, forming the sections of said blank on each side of the centerline thereof into substantially semi-cylindrical shape having internal projections forming locking members and then bending the material of said blank between the end of said slot and the end of said blank to form the coupling socket.

3. The method of making hollow coupling sockets having an enlarged head portion at one end from suitable material which comprises forming a blank having a central longitudinal slot extending in from one end of said blank to the head portion material, the material of said portion in alinement with said slot being made thinner than the adjacent material, forming the sections of said blank on each side of said thinner section and said slot into substantially semi-cylindrical shape having internal projections on the head portion forming locking members and then bending the material of said blank along the said thinner section of the head portion to form the coupling socket.

4. The method of making hollow articles, comprising forming an integral blank having two semi-cylindrical portions of the same radius connected together along a line parallel to their axes and also having two semi-cylindrical portions of the same radius which, however, is smaller than the radius of the first mentioned portions, the latter mentioned portions being respectively connected to the first mentioned portions, but separated from one another; and so bending the blank along the line connecting the first mentioned portions that the completed article comprises two cylindrical portions of different radii, the exterior of the portion having the larger radius being in the form of a smooth-surfaced cylinder.

5. The method of making hollow coupling sockets comprising forming an integral blank having two semi-cylindrical portions of the same radius with internal projections forming locking members, said portions being connected together along a line parallel to their axes, and said blank also having two semi-cylindrical portions of the same radius which, however, is smaller than the radius of the first mentioned portions,—the latter mentioned portions being respectively connected to the first mentioned portions, but separated from one another; and so bending the blank along the line connecting the first mentioned portions that the completed article comprises two cylindrical portions of different radii, the exterior of the portion having the larger radius being in the form of a smooth-surfaced cylinder.

WHITNEY MERRILL.